United States Patent [19]

Tanaka et al.

[11] Patent Number: 5,352,856
[45] Date of Patent: Oct. 4, 1994

[54] METHOD AND APPARATUS FOR INPUTTING COORDINATES

[75] Inventors: Atsushi Tanaka; Shinnoskue Taniishi, both of Kawasaki; Yuichiro Yoshimura; Kiyoshi Kaneko, both of Yokohama; Ryozo Yanagisawa, Matsudo; Katsuyuki Kobayashi, Yokohama; Takeshi Kamono, Choshi, all of Japan

[73] Assignee: Canon Kabushiki Kaisha, Tokyo, Japan

[21] Appl. No.: 779,822

[22] Filed: Oct. 21, 1991

[30] Foreign Application Priority Data

Oct. 24, 1990 [JP] Japan .................................. 2-284446

[51] Int. Cl.$^5$ .............................................. G08C 21/00
[52] U.S. Cl. ........................................ 178/18; 128/19; 345/177; 367/907
[58] Field of Search ................... 178/15, 19, 20, 87; 240/706; 364/109.11; 367/907; 345/177

[56] References Cited

U.S. PATENT DOCUMENTS

| 4,886,943 | 12/1989 | Suzuki et al. .................. 340/706 X |
| 4,931,965 | 6/1990 | Kaneko et al. .................... 178/18 X |
| 5,070,325 | 12/1991 | Tanaka et al. ...................... 340/706 |
| 5,097,415 | 3/1992 | Yoshimura et al. .................. 178/18 |

FOREIGN PATENT DOCUMENTS

| 0333219 | 9/1989 | European Pat. Off. . |
| 63-136127 | 6/1988 | Japan . |
| 63-314634 | 12/1988 | Japan . |

Primary Examiner—Stephen Chin
Assistant Examiner—Paul Loomis
Attorney, Agent, or Firm—Fitzpatrick, Cella, Harper & Scinto

[57] ABSTRACT

A coordinates input apparatus for detecting coordinate values of an arbitrary point by indicating the arbitrary point on a vibration transmission plate by a vibration input pen for generating a vibration, comprises: a plurality of sensors, arranged at predetermined positions in the vibration transmission plate, for detecting the vibration generated by the indication by the vibration input pen, for converting the vibration into electric signals, and for outputting; a measuring circuit to measure delay times from a time point when the arbitrary point has been indicated by the vibration input pen until time points when the electric signals are detected; an obtaining circuit to obtain origin correction data from a plurality of points on the vibration transmission plate; a memory to store the origin correction data; and a processor for reading out the origin correction data from the memory, for correcting the coordinate values on the basis of the delay times measured by the measuring circuit and the origin correction data, and for calculating the coordinate values. The processor has a selector to select the origin correction data of the optimum point so as to execute the optimum coordinate value correction from the origin correction data obtained from the plurality of points and stored in the memory.

7 Claims, 6 Drawing Sheets

METHOD AND APPARATUS FOR INPUTTING COORDINATES

BACKGROUND OF THE INVENTION

1. Field of the Invention

The invention relates to a coordinates input apparatus and, more particularly, to a coordinates input apparatus for correcting accuracy by using, for instance, a propagation delay time of a surface acoustic wave.

2. Related Background Art

Hitherto, the following method has been used as a method of correcting an origin of a coordinates input apparatus using a surface acoustic wave. For instance, when sensors $S_0$ to $S_3$ are arranged on a vibration transmission plate as shown in FIG. 6, origin correction coefficients ($n_n$), distances ($d_n$) from a point P (x, y) to the sensors, an x coordinate value (x) of the point P, and a y coordinate value (y) of the point P are respectively obtained by the following equations (1) to (4) on the assumption that known group delay times and phase delay times from an origin (point O in FIG. 6) to the sensors are set to $tgz_n$ and $tpz_n$ (n=0 to 3) and group delay times and phase delay times from an arbitrary point P (x, y) on the vibration transmission plate to the sensors are respectively set to $tg_n$ and $tp_n$ (n=0 to 3).

$$n_n = [(v_g(tg_n - tgz_n) - v_p(tp_n - tpz_n))/\lambda + 1/N] \quad (1)$$

$$d_n = n_n \cdot \lambda + v_p(tp_n - tpz_n) \quad (2)$$

$$x = (d_0^2 - d_1^2)/2X + d_0/Dz_0 - d_1/Dz_1 \quad (3)$$

$$y = (d_2^2 - d_3^2)/2Y + d_2/Dz_2 - d_3/Dz_3 \quad (4)$$

where, vg: group velocity
vp: phase velocity
λ: wavelength of vibration wave
X: distance between the sensors $S_0$ and $S_1$
Y: distance between the sensors $S_2$ and $S_3$
$Dz_n$: distance between the sensor and the zero point
N≠0: correction term to form an integer
[ ]: to form an integer by omitting the figures below a decimal point That is, an origin correction is performed by considering group delay time and phase delay time which are measured by each sensor.

In the conventional method, however, as will be also obviously understood from the equation (1), when the position of the point P whose coordinate values are detected is far from the point O, a difference between the delay time from the point O to the sensor and the delay time from the point P to the sensor increases, so that the value of $n_n - [n_n]$ also increases in association with such an increase in delay time difference. In addition, since the value of $n_n$ is rounded to an integer, for instance, when N in the equation (1) assumes 2 and the value of $n_n$ is rounded to the nearest whole number, the value of $n_n - [n_n]$ discontinuously changes by only ±1 at the points where the position of the point P whose coordinate values are detected is fairly far from the point O as shown in FIG. 7, that is, at points a and b. For this above reason, when a constant of the velocity or the like changes due to a change in component elements of the apparatus such as a variation in thickness of the vibration transmission plate or the like or a change in external environment such as a temperature change or the like, there is a case where the value of [n] is erroneously calculated by ±1 and the accuracy is deteriorated at positions near the points a and b.

Further, in the conventional apparatus, only one origin correction coefficient ($n_n$) is provided for each of the sensors, so that the above deterioration of the accuracy cannot be compensated.

For instance, as a deviation amount of the group velocity from the phase velocity is large, the points a and b approach the point O and points such as to cause the deterioration of the accuracy appear within a range of the vibration transmission plate. Even when such a deviation amount is small, in the case where the size of the apparatus enlarges (in the case where the size of the vibration transmission plate is large), even if the points a and b are sufficiently away from the point O, they can exist in the vibration transmission plate. Consequently, there is a possibility such that such an accuracy deterioration occurs.

As another factor to deteriorate the accuracy, further, there can be mentioned an offset deviation of a whole region as shown in, e.g., FIG. 8 which occurs by a change in delay amount on the circuit or propagating path or by a change in delay amount due to the inclination of the pen or the like. In FIG. 8, the offset deviation occurs on the + side, an allowance of the accuracy correction on the + side decreases, and a possibility such that the accuracy deterioration occurs for a fluctuation from the outside is high. There is also a case where such an offset fluctuates during the operation of the apparatus. The offset cannot be eliminated by the ordinary O point correction.

SUMMARY OF THE INVENTION

It is an object of the invention to provide a coordinates input apparatus which operates in a manner such that information to correct an origin is obtained at a plurality of points on a vibration transmission plate and coordinate values are corrected on the basis of this information, thereby calculating the coordinate values.

Another object of the invention is to provide a coordinates input apparatus which operates in a manner such that information to correct an origin is obtained from one point on a vibration transmission plate; a plurality of number of times and coordinate values are corrected on the basis of this information, thereby calculating the coordinate values.

Still another object of the invention is to provide a coordinates input apparatus which can correct an origin more accurately.

DETAILED DESCRIPTION OF THE PREFERRED EMBODIMENTS

Figure 1:
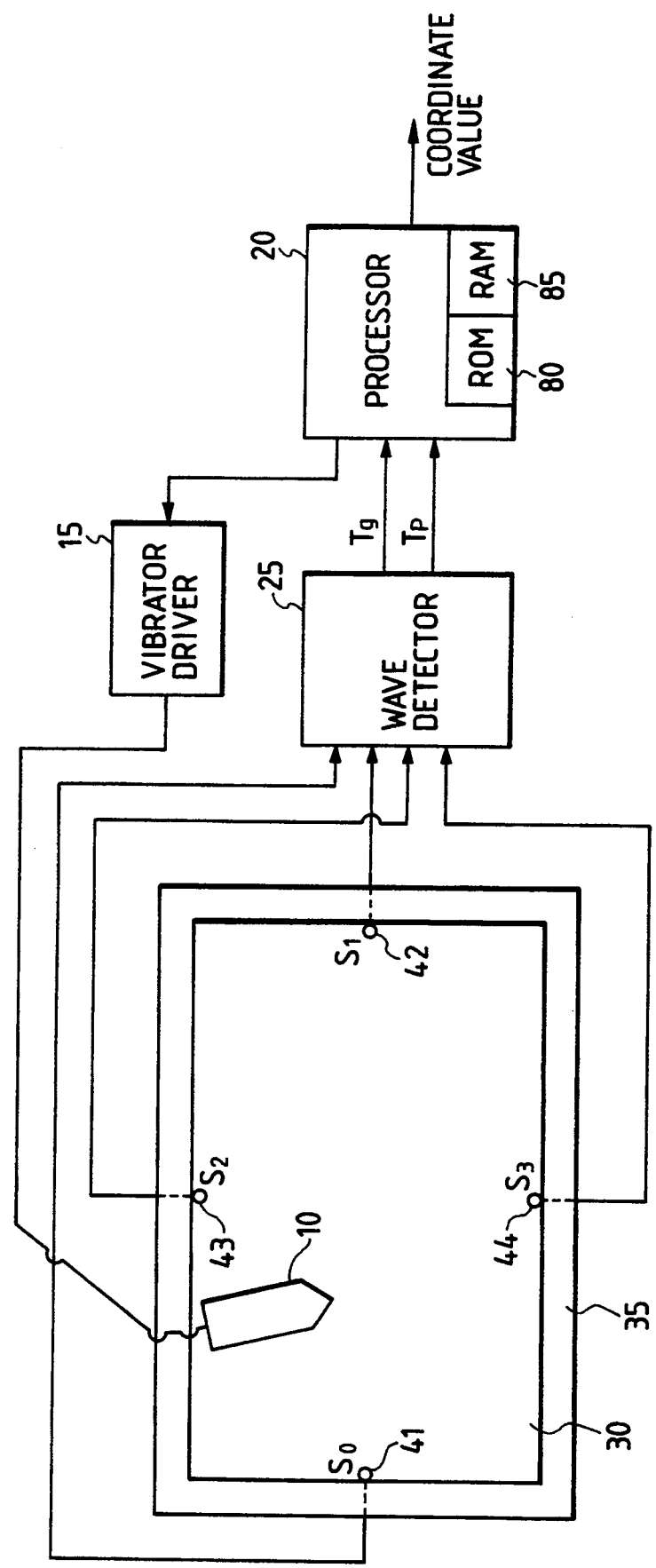
FIG. 1 is a block diagram showing a construction of a coordinates input apparatus as a typical embodiment of the invention.

A preferred embodiment of the invention will be described in detail hereinbelow with reference to the drawings. FIG. 1 is a block diagram showing a construction of a coordinates input apparatus as a typical embodiment of the invention. In FIG. 1, the coordinates input apparatus comprises: a vibration pen 10 to pick up coordinates; a vibrator driver 15 for allowing the vibration pen 10 to generate a vibration; a processor 20 for controlling the vibrator driver 15 and for executing a processing to calculate the coordinates from a phase delay time ($T_p$) and a group delay time ($T_g$) which are obtained; a wave detector 25 to detect the phase delay time and group delay time from a surface acoustic wave; a vibration transmission plate 30 to transmit a vibration wave; a vibration absorbing material 35; and sensors 41 to 44 to detect the vibration wave. The processor 20 has therein an ROM 80 to store a processing program to calculate the coordinates and an RAM 85 to store various data such as phase delay time ($T_p$) and group delay time ($T_g$) and the like.

Figure 2:
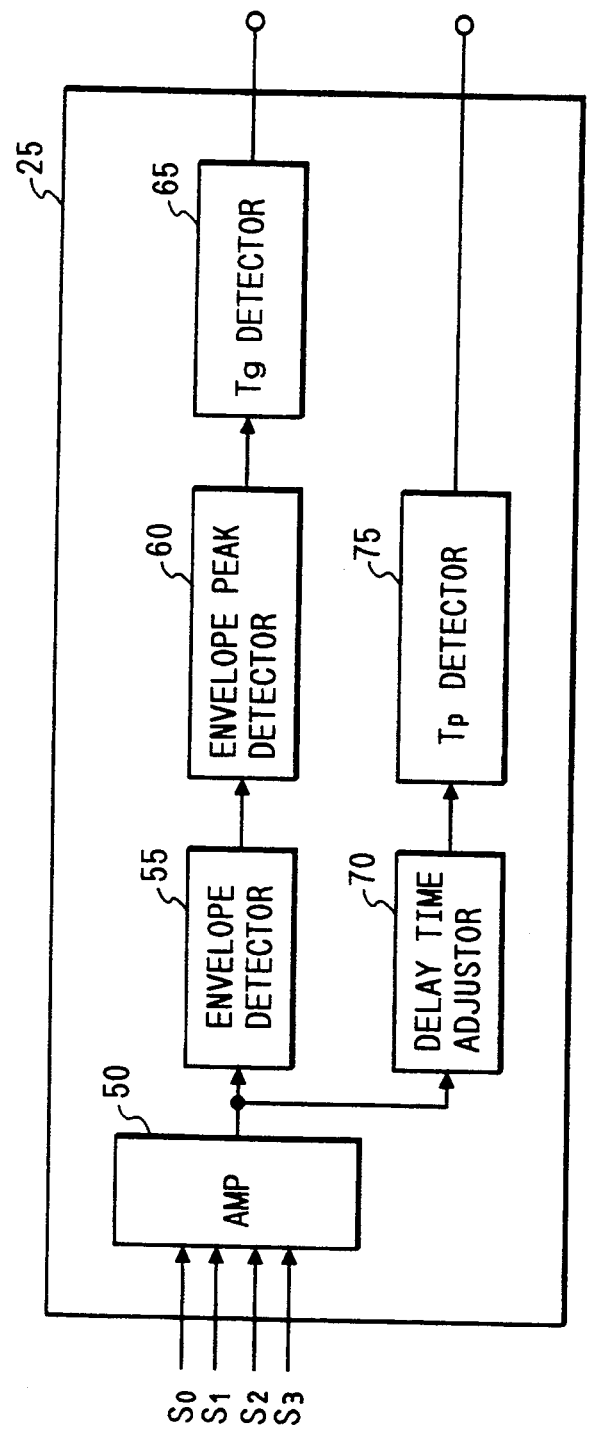
FIG. 2 is a block diagram showing a construction of a wave detector.

FIG. 2 is a block diagram showing a construction of the wave detector 25. In FIG. 2, the surface acoustic waves detected and generated from the sensors 41 to 44 are processed. The group delay time ($T_g$) is supplied from a $T_g$ detector 65 to the processor 20. The phase delay time ($T_p$) is supplied from a $T_p$ detector 75 to the processor 20.

Figure 3A:
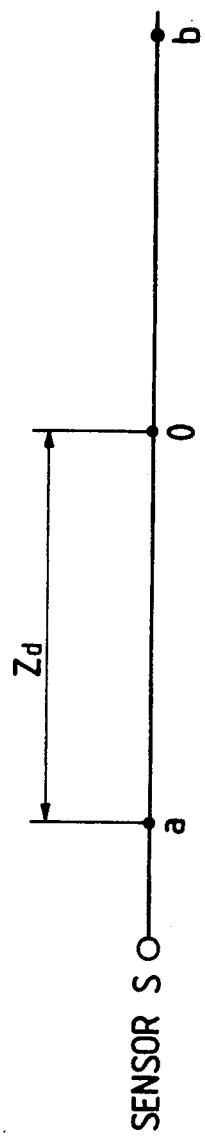
FIGS. 3A and 3B are principle diagrams for correction of an origin.

The origin correction processing in the coordinates input apparatus having the above construction will now be described with reference to principle diagrams for the origin correction shown in FIGS. 3A and 3B and a flowchart shown in FIG. 4. To simplify the explanation, the case where an attention is paid to one sensor S and the phase velocity $V_p$ changes will now be considered.

First, in step S10, a group delay time ($tgz_0$) and a phase delay time ($tpz_0$) at the O point are obtained using vibration pen 10 and those values are stored into the RAM 85 in the processor 20. On the basis of those values, $n-[n]$ is calculated by using the equation (1) with respect to a line connecting the sensor S and the O point as shown in FIG. 3A, so that the result as shown by a solid line 101 shown in FIG. 3B is obtained.

In the case of calculating the coordinate values according to the above solid line, there is a discontinuity of $n-[n]$ at the point (point a) which is away from the O point by a distance zd, so that an error can occur. In the next step S15, correction data of a group delay time ($tgz_a$) and a phase delay time ($tpz_a$) at the point a are obtained and those values are stored into the RAM 85. By calculating $n-[n]$ on the basis of those values by using the equation (1) in a manner similar to step S10, the result of a broken line 102 shown in FIG. 3B is derived.

When comparing the above two results, at the point (point a) where the result of the calculation (solid line 101) of $n-[n]$ based on $tgz_0$ and $tpz_0$ causes a discontinuity, the result of the calculation (broken line 102) of $n-[n]$ based on the group delay time ($tgz_a$) and phase delay time ($tpz_a$) doesn't cause an error (integer error). This means that by calculating n on the basis of $tgz_a$ and $tpz_a$ at a position near the point a and by adding the distance zd which has already been known when $d_n$ is calculated by the equation (2) as a sum or difference, the correct coordinate position can be calculated.

In step S20, a vibration is input at a position by the vibration pen 10. Thereafter, the coordinate values of this position are calculated. There are considered several methods of deciding which values of $tgz_0$ and $tpz_0$ or $tgz_a$ and $tpz_a$ are used to calculate. In the embodiment, in step S25, the value of $n_0-[n_0](=N_0)$ at the O point is calculated. Subsequently, in step S30, the value of $n_a-[n_a](=N_a)$ at the a point is calculated. In step S35, the values of $|N_0|$ and $|N_a|$ are compared. The value which is close to 0 is selected. When the value of $|N_0|$ is closer to 0 than the value of $|N_a|$ as a result of the comparison in step S35, the processing routine advances to step S40 and the coordinates are calculated by using the correction data ($tgz_0$, $tpz_0$) at the O point. On the other hand, when $|N_a|$ is closer to 0, step S45 follows and the coordinates are calculated by using the correction data ($tgz_a$, $tpz_a$) at the a point. After completion of the above processings, the processing routine advances to step S50 and the coordinate values are generated from the processor 20. In step S55, a check is made to see if the detection of the coordinates is continued or not. When the detection is continued, the processing routine is returned to step S20. When the detection is stopped, the processing routine is finished.

There has been described the procedure to detect the coordinate values while correcting the origin by using the method whereby the values ($N_0$ and $N_a$) of $n-[n]$ are calculated by using the correction data at the O point and the a point and either one of the value which is closer to 0 is selected. However, the origin correction and the detection of the coordinate values can be also performed by a method whereby the coordinates are calculated by using both of the correction data at the O and points a and the values of the correction point (O point or point a in this case) which is closer to the calculated coordinate values are selected. As further another method, a correction point different from the point a, for instance, the point b as shown in FIG. 3A is further added and the coordinates can be also calculated by using the a point on the side near the sensor S and by using the point b on the side away from the sensor S. By using a plurality of correction points without limiting to only one point, the discontinuous point of $n-[n]$ which cannot be avoided in the case where a plurality of $n-[n]$ curves are used and only one correction point is used is avoided, so that the accuracy deterioration can be prevented.

The positions of the correction points such as points a and b can be set to arbitrary positions within a fluctuation width of each constant or the like of the apparatus.

The discontinuous point of $n-[n]$ is eliminated by using a plurality of correction points and the accuracy deterioration is prevented in the above embodiment. Further, by using the values calculated by using the data at those points and by executing the calculations to correct those values, the accuracy can be further improved.

Figure 3B:
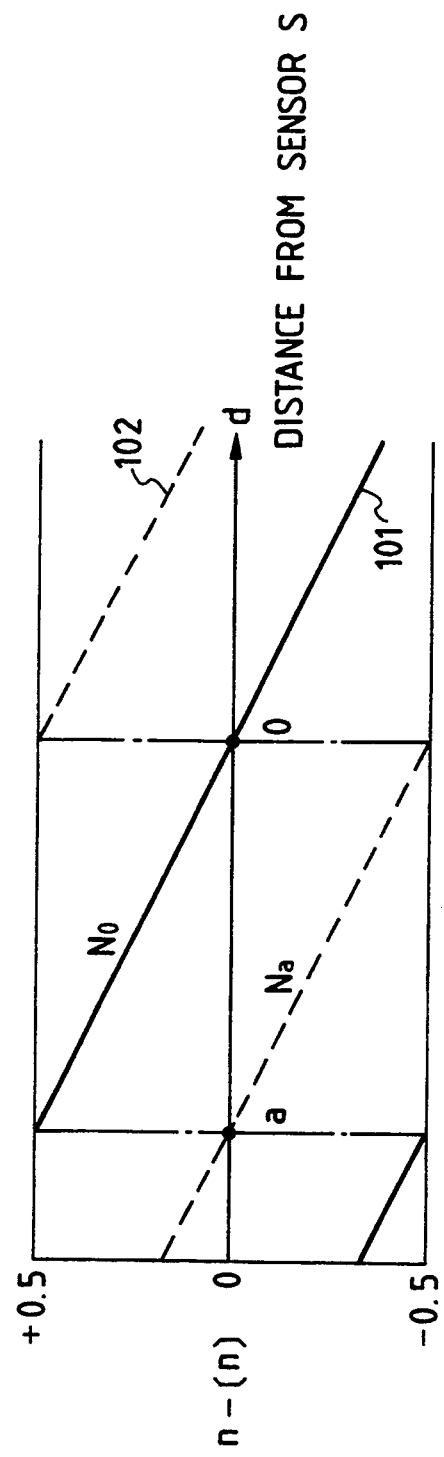
Figure 4:
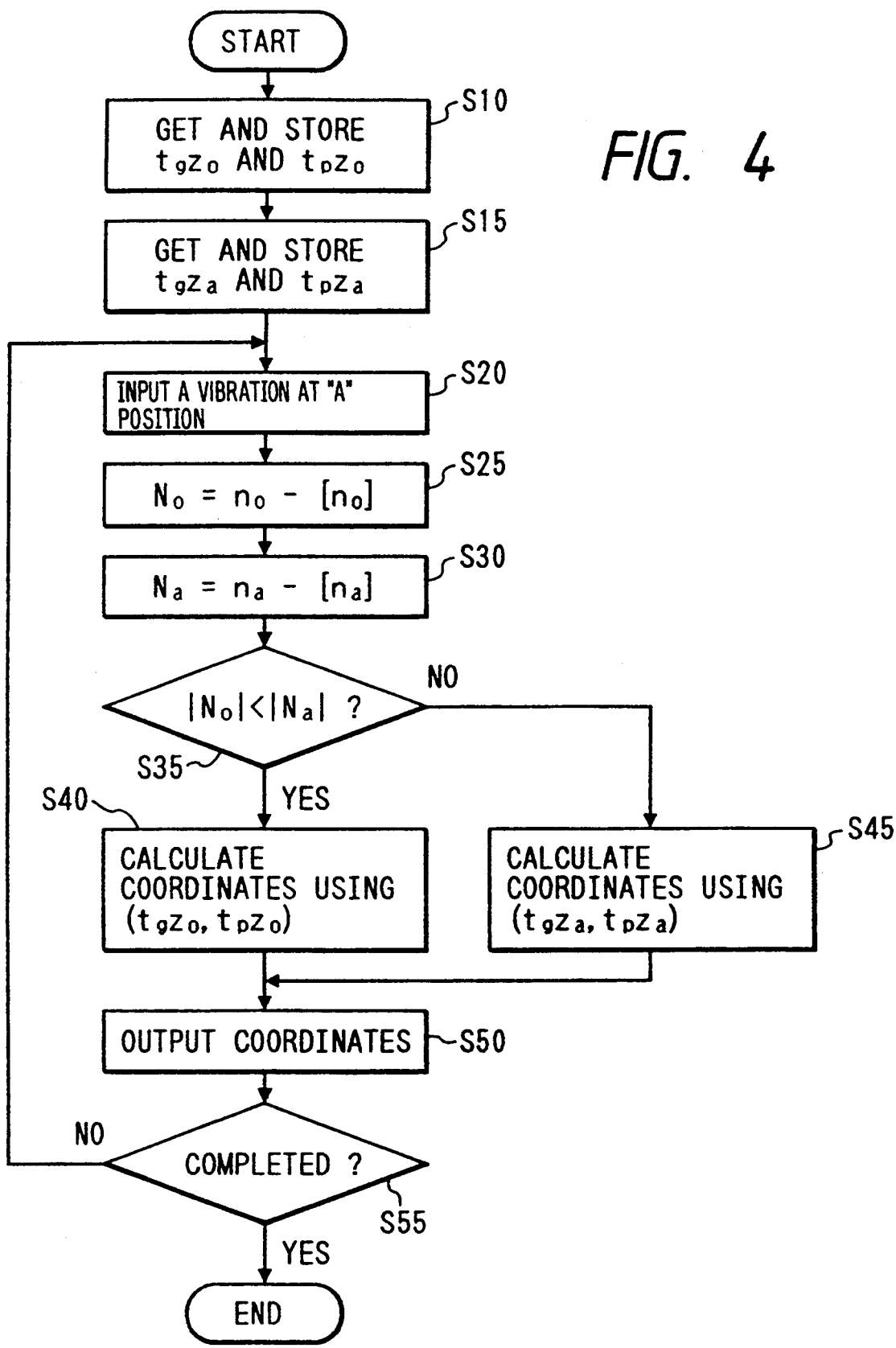
FIG. 4 is a flowchart showing an origin correction processing procedure.

Referring now to FIG. 3B, the value of $N_0-N_a$ is constant in a region between the O and a points. That is, $$N_0 - N_a = \text{const} \tag{5}$$

is satisfied.

However, since the discontinuity occurs in the value of $N_0$ at the point a by only $-1$, when a point is located on the sensor S side other point a in FIG. 3A, a bias value is added to $N_0$, so that $N_0$ is calculated as $N_0+1$.

When the value of the equation (5) deviates from a predetermined value, $N_0$ can be corrected as mentioned above. That is, in the above case, $$N_0 - N_a = \text{const} + 1$$

When a discontinuity exists in the value of $N_0$ at a point in the direction opposite to the point a with respect to the O point as a center, a correction of $N_0 = N_0 - 1$ is executed.

Although the embodiment has been described above by paying an attention to the value of n, a distance error similar to n can also occur in the calculation of d. In the above case as well, the distance error can be reduced by providing a plurality of correction points as mentioned above.

In the above description, the error is reduced by selecting the optimum one of a plurality of correction points. The error can be also reduced, however, by executing the correction by using a mean value or the like of the data derived from a plurality of correction points. The above correction can be also obviously omitted so long as a possible error doesn't cause any practical problem.

In the embodiment, a consideration has been made with respect to only one sensor S for simplicity of explanation. When there are a plurality of sensors, however, similar processings are executed with respect to each sensor in processing steps S10, S15, S25, S30, S40, and S45.

[Another embodiment]

Figure 5:
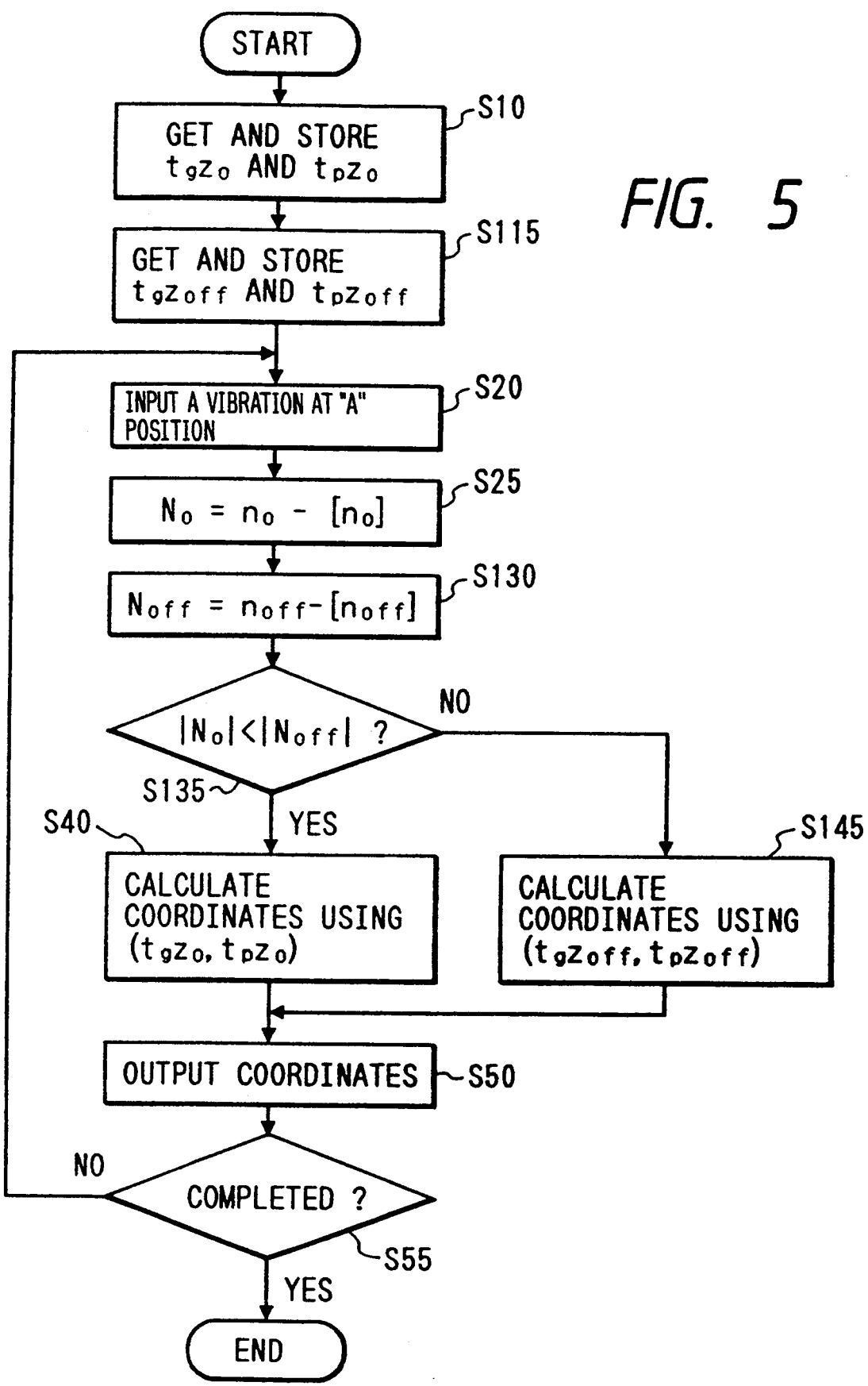
FIG. 5 is a flowchart showing an origin correction processing procedure according to another embodiment.
Figure 6:
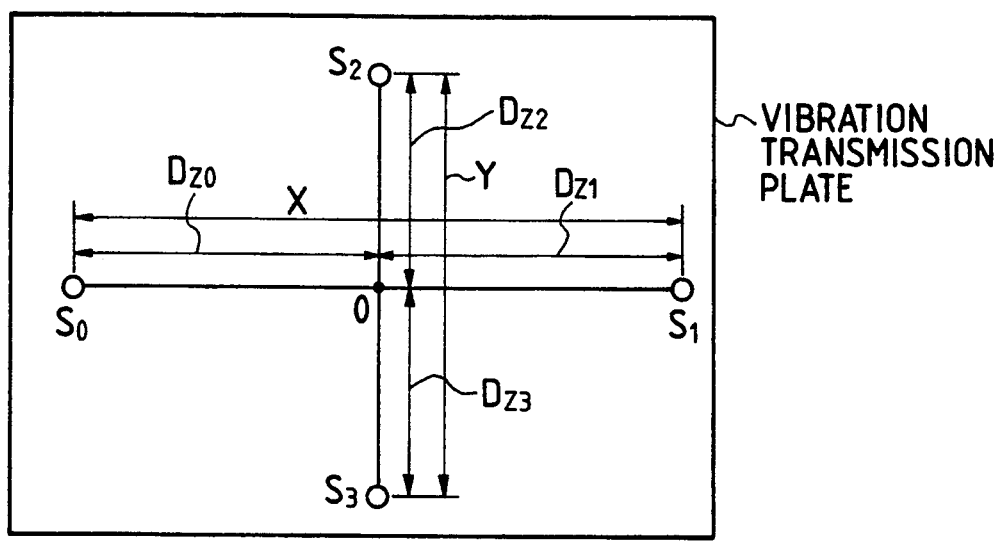
FIG. 6 is a diagram showing an arrangement of sensors according to a conventional apparatus.
Figure 7:
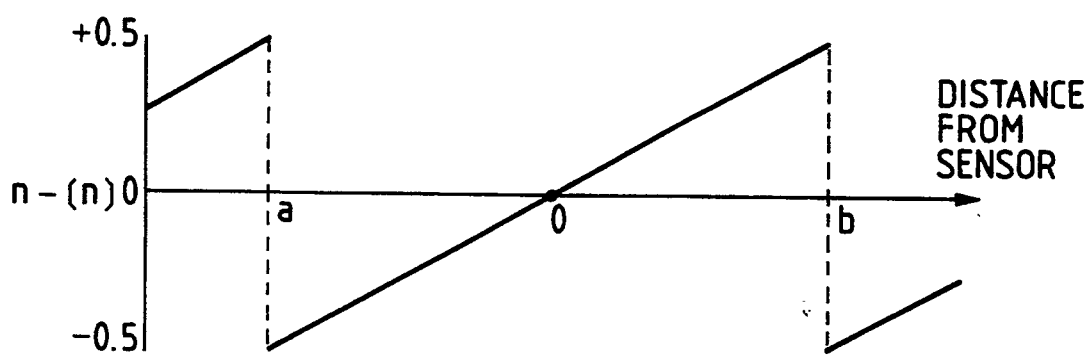
FIG. 7 is a principle diagram for origin correction according to the conventional apparatus.

In the above embodiment, the correction data have simultaneously been obtained at different points (O point and a point). In another embodiment, the case where a plurality of correction data are obtained at the same point under different conditions and the correction is performed will now be explained with reference to a flowchart of FIG. 5. In the embodiment, the coordinates input apparatus used in the foregoing embodiment is used. Therefore, the same parts and components as those in the apparatus of the foregoing embodiment are designated by the same reference numerals and their descriptions are omitted unless otherwise specified. In the flowchart of FIG. 5, further, the same processing steps as those in FIG. 4 of the foregoing embodiment are designated by the same step numbers and their descriptions are omitted here.

Figure 8:
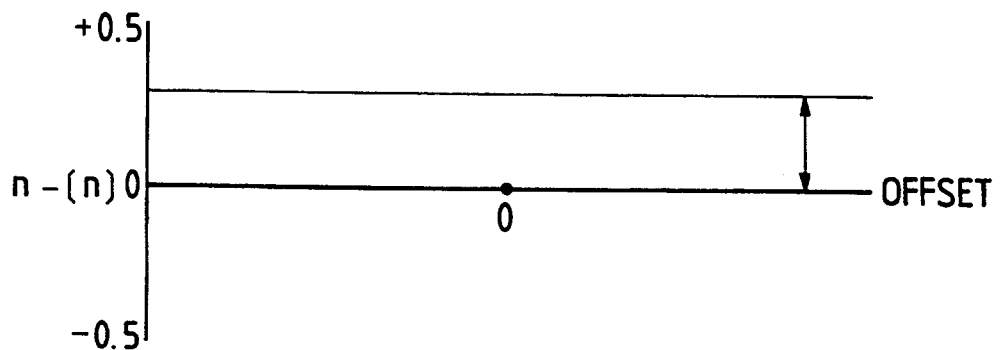
FIG. 8 is a diagram showing an offset deviation in the conventional apparatus.

An offset deviation as shown in FIG. 8 generally occurs by a change in angle when the vibration pen comes into contact with the vibration transmission plate, delay time of the circuit, or offset amount of the propagation delay time.

To correct the offset amount, the values of $tgz_0$ and $tpz_0$ under the ordinary conditions at the O point are calculated and stored, and the correction data ($tgz_{off}$, $tpz_{off}$) under the conditions (hereinafter, referred to as offset conditions) including an offset occurring due to changes in angle, temperature, and the like in step S115 are derived and stored into the RAM 85. The following calculation processings are executed on the basis of the values derived as mentioned above.

In step S130, the value of $n_{off} - [n_{off}](=N_{off})$ is obtained by using the correction data under the offset conditions at the O point. When the value of the result obtained as mentioned above is compared with the value of $n_0 - [n_0](=N_0)$ which is obtained by using the values of $tgz_0$ and $tpz_0$, the value of $N_0$ is close to 0 and the value of $N_{off}$ is away from 0 so long as the conditions of the apparatus upon inputting of the coordinates are close to the conditions when $tgz_0$ and $tpz_0$ are obtained.

Because of the above reasons, in step S135, $|N_0|$ and $|N_{off}|$ are compared. When the value of $|N_0|$ is close to 0, step S40 follows. When the value of $|N_{off}|$ is close to 0, step S145 follows. In step S145, the coordinates are calculated by using the correction data under the offset conditions at the O point.

As mentioned above, the coordinates are calculated by selectively using either the correction data obtained under the ordinary conditions at the O point or the correction data under the offset conditions. Thus, the accuracy deterioration occurring due to, particularly, the offset deviation can be prevented.

By calculating the coordinates by using the mean value of $tgz_0$ and $tpz_0$ and the mean value of $tgz_{off}$ and $tpz_{off}$, the processing to select the correction data which is necessary every input of the coordinates can be eliminated, so that the calculating speed can be further improved.

Moreover, by combining the embodiment with the foregoing embodiment and by providing the correction data at a plurality of points, the correction can be more effectively executed in correspondence to the offset deviation, changes in component elements of the apparatus, change in external environment, or the like.

In the embodiment, consideration has been made with respect to only one sensor S for simplicity of explanation. However, when a plurality of sensors exist, similar processes are executed with respect to each sensor in the processing steps S10, S115, S125, S130, S140, and S145.

Therefore, according to the foregoing embodiments, the optimum correction data is selected on the basis of a plurality of origin correction data derived at the same point or a plurality of points and the coordinates calculation and the correction calculation are performed. Thus, the accuracy deterioration due to a variation in component elements and a fluctuation of external factors can be prevented. The origin correction can be more precisely executed.

What is claimed is:

1. A coordinates input apparatus in which by indicating an arbitrary point on a vibration transmission plate by a coordinate indicating device for generating a vibration, coordinate values at said arbitrary point are detected, comprising:

a plurality of detecting means, arranged at predetermined positions in the vibration transmission plate, for detecting the vibration which is generated by the indication by the coordinate indicating device, for converting the vibration into electric signals, and for outputting;

measuring means for measuring delay times from a time point when the indication has been performed by the coordinate indicating device until time points when the electric signals are detected;

obtaining means for obtaining origin correction data from a plurality of points on the vibration transmission plate;

memory means for storing the origin correction data; and calculating means for reading out the origin correction data from the memory means, for correcting the coordinate values on the basis of the delay times measured by the measuring means and the origin correction data, and for calculating the coordinate values.

2. An apparatus according to claim 1, wherein the calculating means comprises selecting means for selecting the origin correction data at an optimum point so as to execute the optimum coordinate value correction from the origin correction data derived from said plurality of points and stored in the memory means.

3. An apparatus according to claim 1, wherein the calculating means comprises producing means for combining the origin correction data derived from said plurality of points and stored in the memory means and for producing optimum origin correction data.

4. A coordinates input apparatus in which by indicating an arbitrary point on a vibration transmission plate by a coordinate indicating device for generating a vibration, coordinate values at said arbitrary point are detected, comprising:

a plurality of detecting means, arranged at predetermined positions in the vibration transmission plate, for detecting the vibration which is generated by the indication by the coordinate indicating device, for converting the vibration into electric signals, and for outputting;

measuring means for measuring delay times from a time point when the indication has been performed by the coordinate indicating device until time points when the electric signals are detected;

obtaining means for obtaining origin correction data a plurality of number of times from a predetermined position on the vibration transmission plate;

memory means for storing the origin correction data; and calculating means for reading out the origin correction data from the memory means, for correcting the coordinate values on the basis of the delay times measured by the measuring means and the origin correction data, and for calculating the coordinate values.

5. An apparatus according to claim 4, wherein the calculating means comprises selecting means for selecting optimum origin correction data so as to execute an optimum coordinate value correction from the origin correction data derived said plurality of number of times and stored in the memory means.

6. An apparatus according to claim 4, wherein the calculating means comprises producing means for combining the origin correction data derived from said plurality of number of times and stored in the memory means and for producing optimum origin correction data.

7. A coordinate input method comprising:

step 1 of detecting a vibration by vibration sensors, said vibration being transmitted to a vibration transmission plate by a coordinate indicating device for generating a vibration;

step 2 of measuring delay times from a time point when the indication has been performed by the coordinate indicating device in said step 1 until time points when the vibration is detected by the vibration sensors;

step 3 of obtaining origin correction data from a plurality of points on the vibration transmission plate;

step 4 of storing the origin correction data derived in said step 3 into a memory; and step 5 of reading out the origin correction data stored in the memory in said step 4, correcting the coordinate values of the vibration input position in said step 1 on the basis of the delay times measured in said step 2 and the origin correction data read out, and calculating the coordinate values.

* * * * *

UNITED STATES PATENT AND TRADEMARK OFFICE
CERTIFICATE OF CORRECTION

PATENT NO. : 5,352,856
DATED : October 4, 1994
INVENTOR(S) : Atsushi Tanaka, et al.

It is certified that error appears in the above-identified patent and that said Letters Patent is hereby corrected as shown below:

<u>COVER PAGE</u>

Under [75] Inventors, "Shinnoskue Taniishi" should read --Shinnosuke Taniishi--.

<u>COLUMN 4</u>

Line 35, "0" should read --points 0--;
       Line 36, "points" should be deleted and "(0" should read --(point 0--;
       Line 37 "point" (first occurrence) should be deleted; and
       Line 42, "a point" should read --point a--.

<u>COLUMN 5</u>

Line 1, "other" should read --other than--; and
       Line 35, "point and a point" should read --0 and point a--.

Signed and Sealed this

Ninth Day of May, 1995

Attest:

BRUCE LEHMAN

*Attesting Officer*        *Commissioner of Patents and Trademarks*